(12) United States Patent
Westerinen et al.

(10) Patent No.: US 8,619,055 B2
(45) Date of Patent: Dec. 31, 2013

(54) ACTIVE MATRIX TOUCH SENSING

(75) Inventors: William J. Westerinen, Issaquah, WA (US); Craig Steven Ranta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 12/102,024

(22) Filed: Apr. 14, 2008

(65) Prior Publication Data

US 2009/0256815 A1  Oct. 15, 2009

(51) Int. Cl.
*G06F 3/044* (2006.01)

(52) U.S. Cl.
USPC .......................................... 345/174; 178/18.06

(58) Field of Classification Search
USPC ...................... 345/173–174; 178/18.01–20.01
See application file for complete search history.

(56) References Cited

U.S. PATENT DOCUMENTS

| | | | |
|---|---|---|---|
| 5,194,862 A | 3/1993 | Edwards | |
| 5,831,600 A * | 11/1998 | Inoue et al. | 345/173 |
| 5,847,690 A | 12/1998 | Boie et al. | |
| 6,373,474 B1 | 4/2002 | Katabami | |
| 6,452,514 B1 * | 9/2002 | Philipp | 341/33 |
| 6,518,820 B2 | 2/2003 | Gremm | |
| 6,583,777 B2 | 6/2003 | Hebiguchi et al. | |
| 2002/0180675 A1 * | 12/2002 | Tobita et al. | 345/87 |
| 2003/0067451 A1 | 4/2003 | Tagg et al. | |
| 2004/0252116 A1 * | 12/2004 | Tobita | 345/211 |
| 2005/0116937 A1 | 6/2005 | Choi et al. | |
| 2006/0012575 A1 | 1/2006 | Knapp et al. | |
| 2006/0262099 A1 | 11/2006 | Destura et al. | |
| 2006/0262100 A1 * | 11/2006 | Van Berkel | 345/173 |
| 2006/0274251 A1 * | 12/2006 | Song et al. | 349/143 |
| 2007/0070056 A1 | 3/2007 | Sato et al. | |
| 2007/0216657 A1 * | 9/2007 | Konicek | 345/173 |
| 2007/0222762 A1 | 9/2007 | Van Delden et al. | |
| 2007/0247451 A1 * | 10/2007 | Tsubata et al. | 345/204 |
| 2008/0111934 A1 * | 5/2008 | Wu et al. | 349/38 |
| 2008/0158172 A1 * | 7/2008 | Hotelling et al. | 345/173 |
| 2008/0162996 A1 * | 7/2008 | Krah et al. | 714/27 |
| 2009/0002336 A1 * | 1/2009 | Choi et al. | 345/174 |
| 2009/0160787 A1 * | 6/2009 | Westerman et al. | 345/173 |
| 2009/0194344 A1 * | 8/2009 | Harley et al. | 178/18.06 |

FOREIGN PATENT DOCUMENTS

JP    WO2007145346 A1    12/2007

OTHER PUBLICATIONS

Brown et al., "A Continuous-Grain Silicon-System LCD with Optical Input Function", IEEE Journal of Solid-State Circuits, vol. 42, No. 12, Dec. 2007, pp. 2904-2912.
Izadi et al., "Thinsight: Integrated Optical Multi-Touch Sensing Through Thin Form-Factor Displays", Proceedings of the 2007 workshop on Emerging Displays Technologies, ACM, 2007, pp. 4.

\* cited by examiner

*Primary Examiner* — Hong Zhou
(74) *Attorney, Agent, or Firm* — Alleman Hall McCoy Russell & Tuttle LLP

(57) ABSTRACT

An active matrix for a capacitive multiple touch sensing device is disclosed. One embodiment comprises one or more active matrix capacitive touch sensing pixels that each include a capacitor and a thin film transistor, wherein a voltage can be applied to the thin film transistor to address the capacitor. In this way, the thin film transistor can operate as a switch to apply an alternating current to the capacitor, and the capacitor's capacitance can be measured in relation to the alternating current and an externally applied electric field.

11 Claims, 4 Drawing Sheets

ACTIVE MATRIX TOUCH SENSING

BACKGROUND

Touch-sensitive devices may detect touch-based inputs via several different mechanisms, including but not limited to optical, resistive, acoustic, and capacitive mechanisms. Touch-sensitive devices that are capable of sensing multiple touches are increasing in prevalence in the industry.

Capacitive sensors are one of the more cost effective and durable techniques for sensing touch input. A capacitive sensor may be fabricated with a deposition of ITO (Indium Tin Oxide) on glass, plastic, or another substrate. In a capacitive sensor designed for sensing multiple touch points, the ITO is deposited in a fine array of horizontal and vertical lines on different surfaces that form a grid. In this manner, capacitance values may be measured at the intersection of each of the lines forming the grid. Touching at or near the intersection of one or more lines changes the capacitance in the area of the intersection and in turn changes in capacitance can be sensed by supporting electronic circuitry and the touch points can be located algorithmically. Other types of analog capacitive sensors have a single unbroken coating of ITO and oscillators connected to each corner. When touched by a human finger, changes in the relative oscillator frequencies allow computation of the touch point to a high degree of accuracy.

Capacitive touch sensors have constraints in screen resolution and size. These constraints are in part due to electronic scanning of the ITO lines to measure capacitance values because it takes a fixed measurement time to achieve a certain precision. Further, increasing ITO line density for resolution or scaling ITO lines to a larger screen size results in a larger number of lines to be scanned in a similar time frame, reducing the duty cycle of sensing per line and also reducing scan time per each line. Higher density or longer lines also results in increased crosstalk and signal loss. Additionally, accuracy in reading capacitance values is related to measurement time, therefore capacitance readings become less accurate as touch screen sizes or densities increase. Variability in the ITO deposition process may further reduce accuracy in capacitance value measurements.

SUMMARY

Accordingly, various embodiments for an active matrix for a capacitive multiple touch sensing device are described below in the Detailed Description. For example, one embodiment comprises one or more active matrix capacitive touch sensing pixels that each include a capacitor and a thin film transistor, wherein a voltage can be applied to the thin film transistor to address each capacitive junction. In this way, the thin film transistor can operate as a switch to apply an alternating current to the capacitor, and the capacitor's capacitance can be measured in relation to the known alternating current frequency and a known externally applied electric field.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
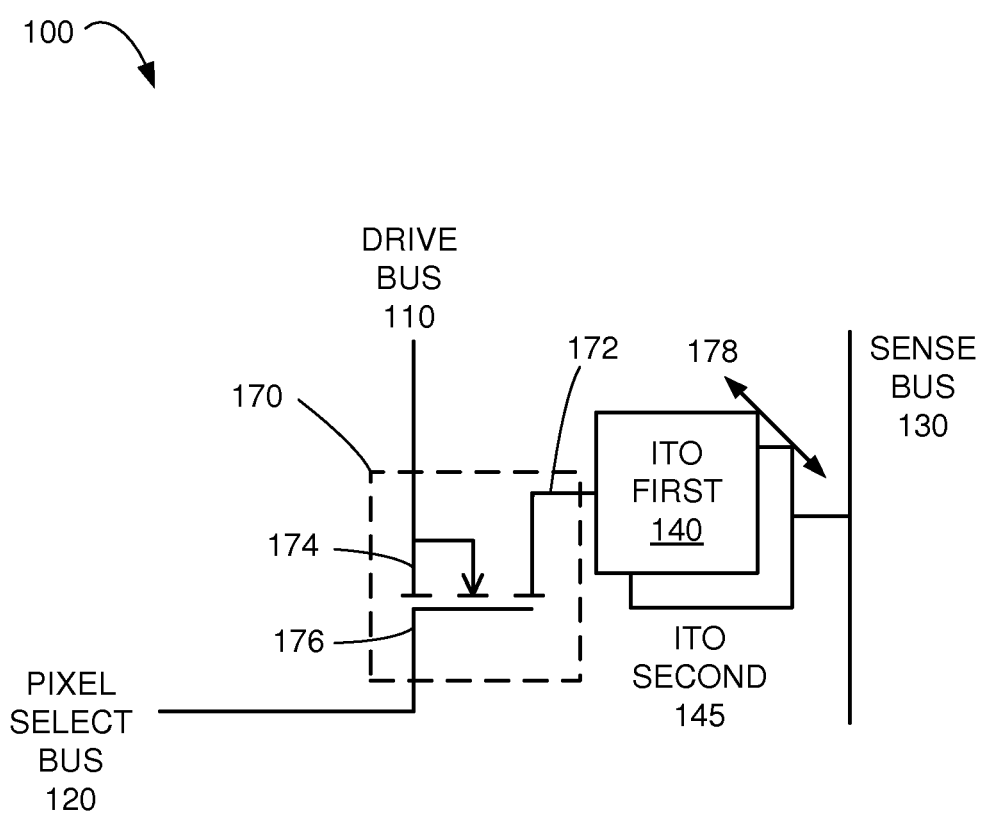
FIG. 1 illustrates an embodiment pixel for an active matrix capacitive touch sensing device.

FIG. 1 illustrates an embodiment pixel 100 for an active matrix capacitive touch sensing device. Pixel 100 includes an ITO first layer 140 and an ITO second layer 145, arranged to create a capacitor, for example by arranging the ITO layers on opposite sides of a glass substrate. The ITO second layer 145 is shown coupled with a metal sense bus 130 which in turn may be coupled with sense circuitry, and the ITO first layer 140 is coupled with a terminal of an active switching element. For example, in pixel 100 the ITO first layer 140 is shown coupled with the drain 172 of a thin film transistor (TFT) 170. One example thin film transistor is a Metal Oxide Semiconductor Field Effect Transistor (MOSFET), but other embodiments are not so limited. Other embodiments may couple the metal sense bus 130 with the ITO first layer 140 in a pixel. Further, the TFT 170 is coupled to a metal drive bus 110 and a metal pixel select bus 120. Additionally, other embodiments may use transparent conductors other than ITO to create a capacitor.

In some embodiments, the metal interconnect bus electrodes comprising the metal drive bus 110, the metal sense bus 130, and the metal pixel select bus 120, may be fabricated with aluminum. Since aluminum is highly conductive, a thin layer can be used without major effect on light transmission of an active matrix capacitive touch sensing device. As a non-limiting example, a metal interconnect bus electrode in pixel 100 may comprise an aluminum trace that is a few microns wide.

In the illustrated example, the metal pixel select bus 120 is coupled to a gate 176 of the TFT 170 and the metal drive bus 110 is coupled to the source 174 of TFT 170, but other embodiments are not so limited. Embodiments may couple a different combination or subset combination of the metal drive bus 110, the metal sense bus 130, and the metal pixel select bus 120 to a first, second, and third terminal of the TFT 170, and still suitably turn on a switching element that opens or closes a circuit to provide a current to the ITO first layer 140 or ITO second layer 145. In the present example, the metal pixel select bus 120 is configured to supply a voltage to the gate 176 of the TFT 170 to actively address the capacitor, and in general, the pixel 100. When a pixel is actively addressed, the metal drive bus 110 is configured to apply an alternating current signal (AC), or other pulse excitation suitable for measuring an unknown capacitance, to a terminal of the TFT 170 and subsequently to the ITO first layer 140. In response to the applied AC at the source 174 of the TFT 170, the metal sense bus 130 will transmit a current that varies with the capacitance between the ITO first layer 140 and the ITO second layer 145. In some embodiments, the metal sense bus 130 may be coupled with additional circuitry to integrate a capacitance value over multiple alternating current cycles to reduce noise in a measured capacitance. In this way, the capacitance in the capacitor will further change in response to a change in electric field 178 applied from an external input such as a touch or pen input on or near the pixel, as well as an electric field applied without contacting the pixel. The applied electric field may be any electric field acting upon the capacitor other than the field induced by the AC signal or pulse excitation. It should be appreciated by those skilled in the art that devices which actively apply an external electric field of a known frequency can also be sensed with the described structure. For example, if the internal AC voltage source used a frequency of 50 kHz to measure capacitance of the matrix junctions, an external active pen device could apply 60 kHz signal and allow the system to distinguish it from a finger.

In another embodiment, the active switching element may be a two terminal diode. For example, an MIM diode may be utilized instead of a TFT 170. In this embodiment, the pixel structure would be fabricated to accommodate the two terminal switching element, for example, a first terminal of the diode could be coupled with a layer of the capacitor, and a second terminal would then be coupled with the metal drive bus 110. Other embodiments may use another arrangement of switching elements and terminal configurations to fabricate a pixel for an active matrix capacitive touch sensing device.

Figure 2:
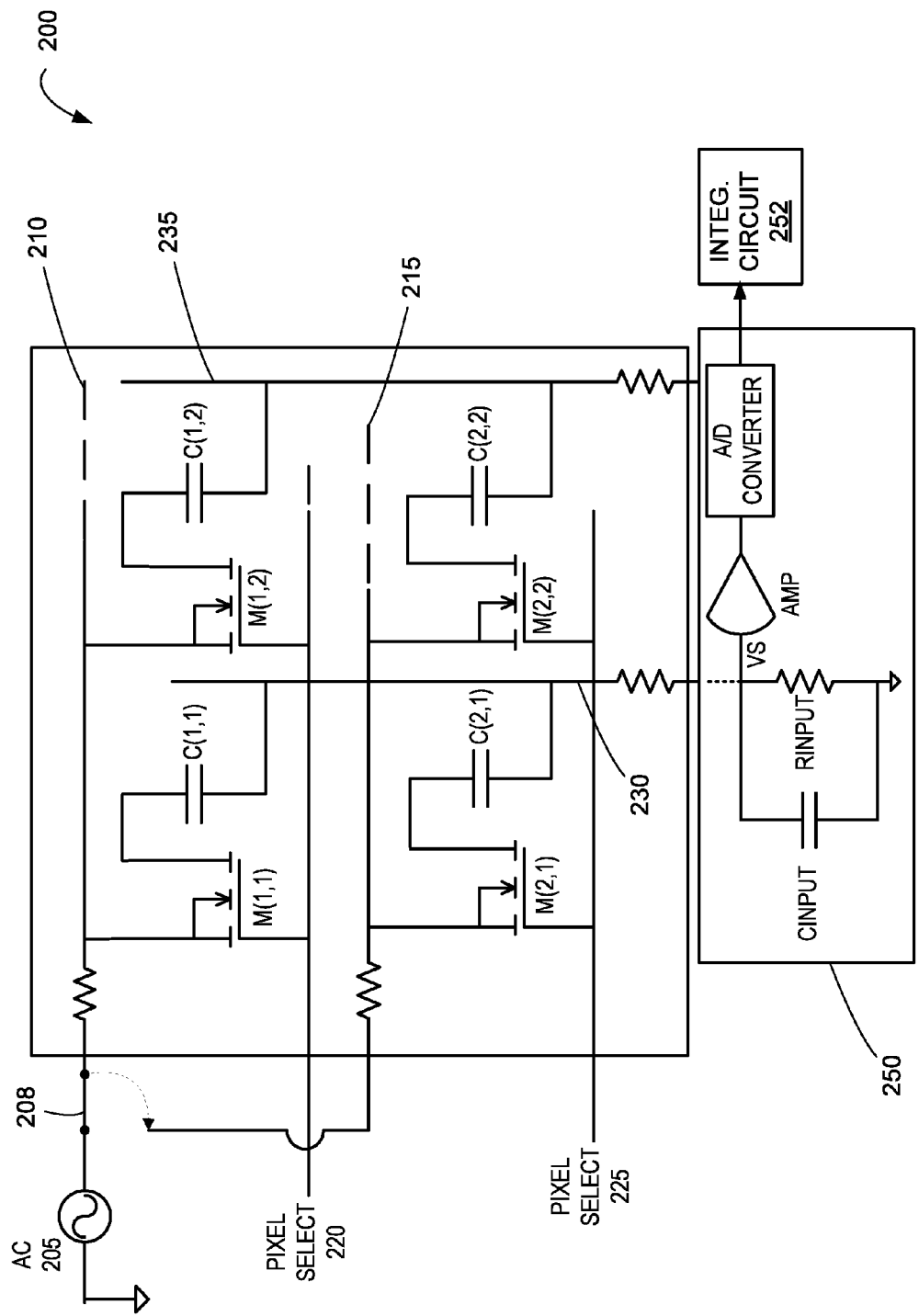
FIG. 2 illustrates an embodiment active matrix capacitive touch sensing device comprised of multiple pixels as illustrated in FIG. 1.

FIG. 2 illustrates an embodiment active capacitive touch sensing device 200 comprised of a plurality of pixels 100 as illustrated in FIG. 1. Touch sensing device 200 utilizes an active switching element at each intersection of a capacitive grid array. The touch sensing device 200 utilizes thin film transistors M(1,1), M(1,2), M(2,1) and M(2,2), as non-limiting examples. In this way, the active switching elements allow each capacitive junction C(1,1), C(1,2), C(2,1) and C(2,2), in a capacitive grid array to be addressed individually without significant crosstalk or leakage, in turn allowing capacitive touch sensors to scale to higher resolutions and larger displays. Other embodiments may comprise other structures or fabrications as described herein.

In some embodiments, the plurality of pixels 100 may be configured in a plurality of rows with each row being coupled with a respective metal drive bus 210 or metal drive bus 215, and the plurality of pixels may further be configured in a plurality of columns with each column being coupled with a respective metal sense bus 230 or metal sense bus 235. Further, a voltage source may be coupled with each metal pixel select bus 220 or metal pixel select bus 225 for each row of pixels, wherein the voltage source is configured to actively address a switching element in each pixel and therefore select a row of pixels in response to a provided voltage.

When each pixel is actively addressed, a metal drive bus 210 is configured to apply an alternating current with AC signal 205, or other pulse excitation, to a terminal of each TFT on the metal drive bus 210, and subsequently to a first layer of each capacitor coupled with the actively addressed pixels. In response to the applied AC at the source of a TFT, the metal sense bus 230 or 235 transmits a current in relation to the capacitance between the layers of the capacitor in each actively addressed pixel. An applied electric field from an external touch or pen input on or near the active matrix capacitive touch sensing device will affect the capacitance of one or more of the capacitors in the device. In this way, the metal sense bus, e.g. metal sense bus 230 or metal sense bus 235, can also transmit a current in response to an electric field applied from an input of the active matrix capacitive touch sensing device.

In some embodiments, a capacitance value may be measured by sequentially injecting the reference AC signal 205 into the rows 210 and 215 one at a time to supply the AC signal 205 to the source lead of each respective TFT, then for each row, each transistor may be sequentially switched on by applying a voltage to the gate lead of the respective TFT, and the resulting AC voltage output from the drain lead of the transistor to the coupled capacitor can be read. A switch 208, for example an analog multiplexer, may be used to switchably connect the AC signal 205 to each metal drive bus 210 and 215. Some embodiments may use other switches or circuitry to switch the AC signal 205 between metal drive busses. In this manner, dynamic values of capacitance for each junction in active capacitive touch sensing device 200 may be measured and passed to a microprocessor for analysis, allowing firmware or software to dynamically adjust thresholds to sense a touch on touch sensing device 200.

In some embodiments, a switch may be used to sequentially couple a metal sense bus for each column in the array with corresponding sense circuitry 250, which may further include at least one sense amplifier.

Additionally, the metal sense bus 230 may be coupled with circuitry 252 to integrate a capacitance value over multiple alternating current cycles to accommodate random noise in a measured capacitance for each pixel junction. This effectively averages Gaussian noise to nearly a null value and noise performance will further improve with a longer integration time. In this way, the touch sensing device 200 may be adjusted to balance the competing interests of responsiveness and accuracy.

In some embodiments, a capacitive array as illustrated in touch sensing device 200 may be directly fabricated into the structure of an LCD to reduce an overall number of structural elements in a device.

In a particular yet non-limiting example of active capacitive touch sensing device 200 in FIG. 2, the gate of transistors M(1,1) and M(1,2) may be connected with metal pixel select bus 220. In a non-selected state, the non-selected metal pixel select bus 225 may be held at approximately -5 volts, causing transistors M(2,1) and M(2,2) to be off, thereby reducing leakage paths through capacitors C(2,1) and C(2,2). Further, the selected row may have approximately +20 volts applied to the metal pixel select bus 220, turning transistors M(1,1) and M(1,2) in the row on. In this state, the AC excitation is then applied to the metal drive bus 210 connecting the sources of M(1,1) and M(1,2) together. This results in current conducted through the junction capacitors C(1,1) and C(2,2) which then travels down metal sense bus 230 or metal sense bus 235 to the sense circuitry 250 with a relatively small voltage drop.

Figure 3:
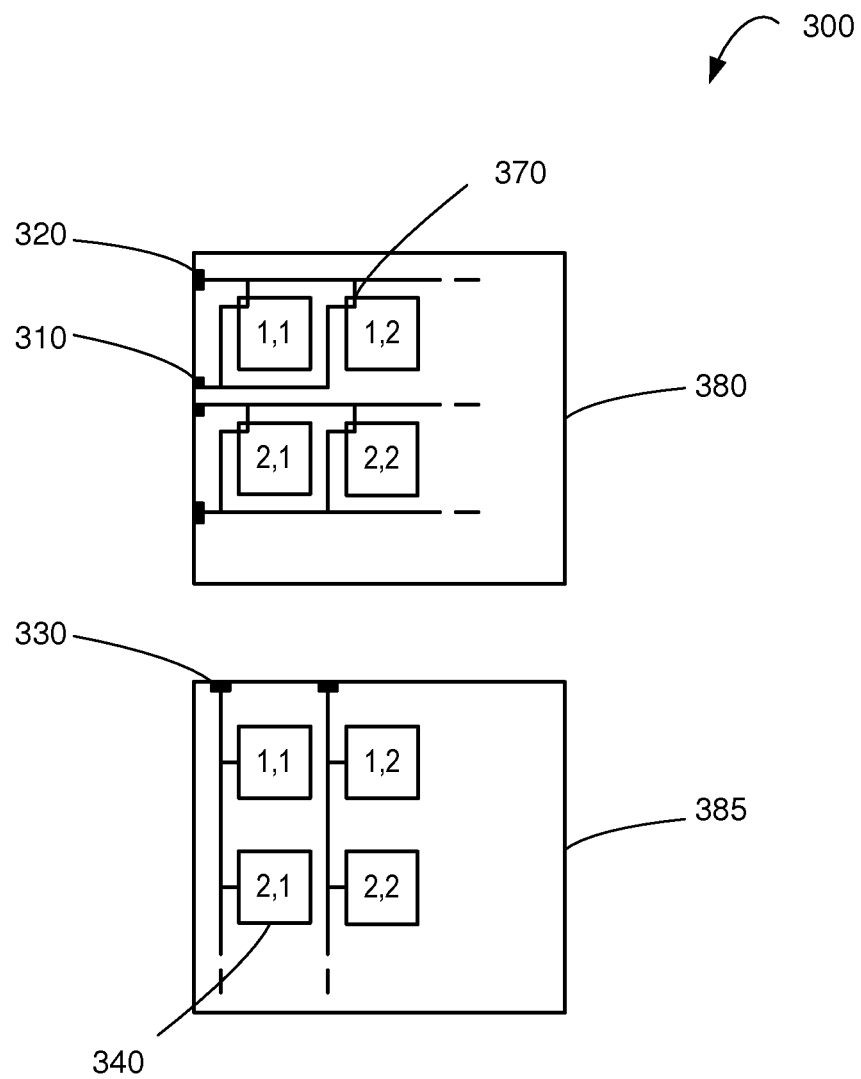
FIG. 3 illustrates an example layout of an embodiment active matrix capacitive touch sensing device.

FIG. 3 illustrates an example layout 300 of an embodiment active matrix capacitive touch sensing device. In this example layout 300, a bottom layer 380 may be fabricated on one side of a glass substrate. Alternatively, the bottom layer may be on a second substrate and laminated to the top layer with a transparent adhesive for added strength and/or ease of fabrication. In this example layout, the bottom layer 380 may includes a metal pixel select bus 320 coupled with the gate of each TFT 370 in a row of the active matrix capacitive touch sensing device, a metal drive bus 310 coupled with the source of each TFT 370 in the same row, and a layer of an ITO capacitor. Additionally, the top layer 385 may then include a layer of an ITO capacitor arranged to create a capacitive effect with the layer of the ITO capacitor on bottom layer 380. The top layer 385 may further include a metal sense bus 330 coupled to the drain of each TFT 370 in a column of pixels in the active matrix capacitive touch sensing device. The bottom layer 380 may be the first layer 140 or the second layer 145 in FIG. 1, and in this arrangement the top layer 385 could be the other of the first layer 140 and the second layer 145. Another embodiment may provide a second thin substrate laminated to the bottom layer 380, wherein the top layer circuitry may be fabricated. In this arrangement, the top layer 385 may be hard coated or covered with a thin protective layer to prevent damage to the ITO 340 and bus lines. Additionally, other embodiments may comprise other structures or fabrications.

For example, the drive and sense circuitry can be arranged with the drive circuitry on a top layer of the glass substrate and the sense circuitry on the bottom layer of the glass substrate.

Figure 4:
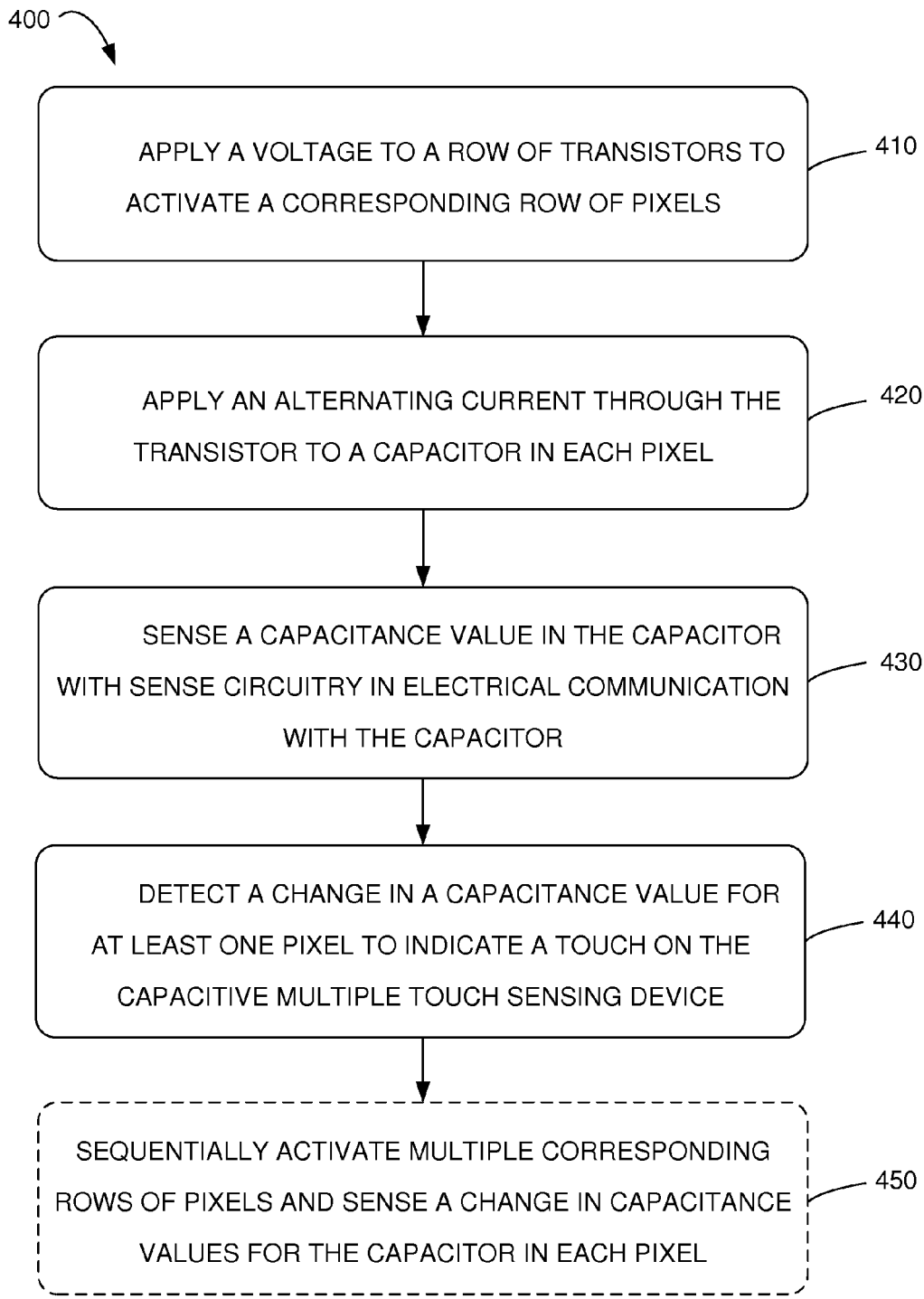
FIG. 4 illustrates a flow diagram of an example method of operation for an active matrix capacitive touch sensing device.

FIG. 4 shows a flow diagram of an embodiment of a method 400 using an active matrix in a capacitive multiple touch sensing device. In one example, the active matrix may comprise a plurality pixels with each pixel including a capacitor coupled with a thin film transistor. Further, the pixels may be arranged in rows that are coupled with a metal drive bus and also arranged in columns that are coupled with a metal sense bus. In this way, the metal sense bus may be coupled to sense circuitry, and a metal pixel select bus may be coupled to each row of pixels to provide an active matrix capacitive multiple touch sensing device according to method 400.

First, as indicated in block 410, method 400 comprises applying a voltage through the transistors to activate a corresponding row of pixels by creating a channel in each transistor. This may comprise sequentially applying a voltage to a plurality of metal pixel select buses, where each of the metal pixel select buses are coupled with a plurality of gates of transistors as illustrated in the active matrix capacitive touch sensing device in FIG. 2. Method 400 also comprises applying an alternating current signal through the transistor to the capacitor in each pixel in the row, as indicated in block 420. Next, method 400 comprises sensing a capacitance value in each capacitor with sense circuitry in electrical communication with the capacitors, as indicated at 430. Method 400 then comprises detecting a change in a capacitance value for at least one pixel to indicate a touch on the capacitive multiple touch sensing device, as indicated in block 420.

In some embodiments, method 400 may sequentially activate multiple corresponding rows of pixels and sense a change in capacitance values for the capacitor in each pixel of an active matrix capacitive multiple touch sensing device. In some embodiments, method 400 may further comprise integrating a plurality of capacitances over multiple alternating current cycles to reduce electrical noise effects in the capacitances. Method 400 may also include actively providing the functionality of other aspects of the embodiments described herein with reference to FIGS. 1-3.

It will be understood that the configurations and/or approaches described herein are exemplary in nature, and that these specific embodiments or examples are not to be considered in a limiting sense, because numerous variations are possible. The order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems, and configurations, and other features, functions, acts, and/or properties disclosed herein, as well as any and all equivalents thereof.

The invention claimed is:

1. An active matrix capacitive touch sensing device with an array of pixels, the device comprising:
   a glass substrate including a first side to accept touch input and a second side;
   a plurality of rows of pixels, each row being coupled with a metal drive bus;
   a plurality of columns of pixels, each column being coupled with a metal sense bus;
   a voltage source switchably coupled with a metal pixel select bus for each row of pixels, the voltage source configured to select a row of pixels by providing a voltage to that row of pixels; and
   a first analog multiplexer to sequentially couple the metal sense bus for each column in the array with sense circuitry;
   each pixel of the array of pixels comprising:
      a capacitor including a first layer on the first side of the glass substrate and a second layer on the second side of the glass substrate;
      a thin film transistor having a drain, a source, and a gate, the drain being coupled directly with the first layer of the capacitor;
      a metal pixel select bus coupled directly with the gate of the thin film transistor, the metal pixel select bus to supply a voltage to the gate of the thin film transistor to actively address the capacitor, wherein the metal pixel select bus is held at a negative voltage in a nonselected state and a positive voltage in a selected state;
      a metal drive bus coupled with the second terminal of the thin film transistor, the metal drive bus to supply an alternating current signal to the second, wherein the metal pixel select bus, the thin film transistor, and the metal drive bus are on the first side of the glass substrate;
      a metal sense bus coupled with the second layer of the capacitor on the second side of the glass substrate, the metal sense bus to transmit a current that varies with the capacitance of the capacitor to the sense circuitry in response to the alternating current signal received at the source of the thin film transistor and further in response to an electric field applied from an external input to the active matrix capacitive touch sensing device; and
   wherein the sense circuitry is configured to detect a first change in capacitance of at least one capacitor of the array of pixels to indicate an external passive touch input at or near the at least one capacitor, detect a second change in capacitance of at least one capacitor of the array of pixels that is different from the first change in capacitance, wherein the second change in capacitance indicates an active device applying an external current signal at or near the at least one capacitor, and distinguish input of the active device from input of the external passive touch input based on the difference between the first change in capacitance and the second change in capacitance.

2. The active matrix capacitive touch sensing device of claim 1, further comprising a second analog multiplexer to sequentially inject the alternating current signal to each of the plurality of rows of pixels, wherein the voltage source is further configured to switch on each of the plurality of row of pixels while the alternating current signal is injected.

3. The active matrix capacitive touch sensing device of claim 1, wherein the first layer and the second layer of each capacitor are indium tin oxide.

4. The active matrix capacitive touch sensing device of claim 1, wherein each metal pixel select bus and each metal drive bus are aluminum.

5. The active matrix capacitive touch sensing device of claim 1, coupled with circuitry to integrate the capacitance over multiple alternating current cycles.

6. The active matrix capacitive touch sensing device of claim 1, wherein the voltage source provides a negative voltage to each non-selected metal pixel select bus in order to reduce leakage current.

7. The active matrix capacitive touch sensing device of claim 1, wherein the first layer of the capacitor is either hard coated or covered with a thin protective layer.

8. The active matrix capacitive touch sensing device of claim 1, wherein the sense circuitry includes at least one sense amplifier.

9. A method for using an active matrix in a capacitive multiple touch sensing device, the active matrix comprising a plurality of pixels arranged in rows and columns, each pixel including a capacitor coupled with a thin film transistor having a drain, a source, and a gate, the drain being coupled directly with a first layer of the pixel, each row of pixels coupled directly with a metal drive bus through the source, and each column of pixels coupled directly with a metal sense bus that is coupled to sense circuitry, each row of pixels further coupled directly with a metal pixel select bus through the gate, the method comprising:

applying a positive voltage to a metal pixel select bus of a selected row of pixels from a voltage source on a first side to accept touch input of glass substrate to form a channel in each transistor in the selected row of pixels coupled with the metal pixel select bus;

applying a negative voltage to other metal pixel select buses of nonselected rows of pixels to maintain thin film transistors of pixels in the nonselected rows in an off state;

applying an alternating current signal from an alternating current source that is different than the voltage source to a plurality of capacitors through a metal drive bus on the first side of the glass substrate and through a transistor coupled to that capacitor;

sensing a capacitance of each of the plurality of capacitors via the metal sense bus on a second side of the glass substrate using the sense circuitry;

detecting a first change in a capacitance of at least one capacitor of the plurality of capacitors to indicate an external passive touch input at or near that at least one capacitor;

detecting a second change in capacitance of at least one capacitor of the plurality of capacitors that is different from the first change in capacitance, wherein the second change in capacitance indicates an active device applying an external current signal at or near the at least one capacitor; and distinguishing input of the active device from input of the external passive touch input based on the difference between the first change in capacitance and the second change in capacitance.

10. The method of claim 9, further comprising:

sequentially applying a voltage to each metal pixel select bus and an alternating current to each metal drive bus;

sequentially sensing, for each pixel in the capacitive multiple touch sensing device, a change in a capacitance of each pixel's capacitor using the sense circuitry.

11. The method of claim 9, further comprising integrating a plurality of capacitances for a single capacitor over multiple alternating current cycles.

* * * * *